(12) United States Patent
Leung et al.

(10) Patent No.: US 6,580,912 B2
(45) Date of Patent: *Jun. 17, 2003

(54) METHOD AND APPARATUS FOR A HIGH-CAPACITY CELLULAR NETWORK BY IMPROVED SECTORIZATION AND INTERLEAVED CHANNEL ASSIGNMENT

(75) Inventors: Kin K. Leung, Edison, NJ (US); Li-Chun Wang, Eatontown, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/948,816

(22) Filed: Sep. 10, 2001

(65) Prior Publication Data

US 2002/0019233 A1 Feb. 14, 2002

Related U.S. Application Data

(63) Continuation of application No. 09/321,047, filed on May 27, 1999, now Pat. No. 6,311,068.
(60) Provisional application No. 60/104,764, filed on Oct. 19, 1998.

(51) Int. Cl.[7] .................................................. H04Q 7/36
(52) U.S. Cl. ........................................ 455/447; 455/422
(58) Field of Search ................................ 455/422, 446, 455/447

(56) References Cited

U.S. PATENT DOCUMENTS

| | | | |
|---|---|---|---|
| 5,111,534 A | 5/1992 | Benner | |
| 5,307,507 A | 4/1994 | Kanai | |
| 5,365,571 A | 11/1994 | Rha et al. | |
| 5,649,292 A | 7/1997 | Doner | |
| 5,734,983 A | 3/1998 | Faruque | |
| 5,740,536 A | 4/1998 | Benveniste | |
| 5,787,352 A | 7/1998 | Benveniste | |
| 5,802,173 A | 9/1998 | Hamilton-Piercy et al. | |
| 5,802,474 A | 9/1998 | Faruque | |
| 5,809,395 A | 9/1998 | Hamilton-Piercy et al. | |
| 5,809,423 A | 9/1998 | Benveniste | |
| 5,819,182 A | 10/1998 | Gardner et al. | |
| 5,832,389 A | 11/1998 | Dent | |
| 5,835,859 A | * 11/1998 | Doner | 455/447 |
| 5,850,608 A | 12/1998 | Faruque | |
| 5,852,651 A | 12/1998 | Fischer et al. | |

OTHER PUBLICATIONS

Li–Chun Wang, "A New Cellular Architecture Based on an Interleaved Cluster Concept," to appear in IEEE Transactions on Vehicular Technology, pp. 1–11.

Thomas K. Fong, et al., "Radio Resource Allocation in Fixed Broadband Wireless Networks," IEEE Transactions on Communications, vol. 46, pp. 806–818, 6/98.

Jun Xiang, "A Novel Two Site Frequency Reuse Plan," IEEE, pp. 441–445, 5/96.

* cited by examiner

Primary Examiner—Lee Nguyen (57) ABSTRACT

A method and apparatus for a high-capacity cellular network by improved sectorization and interleaved channel assignment is presented. Data transmission over a cellular network is carried out by implementation of a sectorization scheme, called the Narrow-Beam Quad-sector Cell (NBQC) sectorization scheme, and the corresponding Interleaved Channel Assignments (ICA). The NBQC sectorization scheme calls for each cell of a cellular network to be divided into four sectors, with each sector covered by a 60 degree antenna. Use of the NBQC sectorization scheme allows for implementation of the corresponding ICA, in which assignment of transmission channels to each cell is based on a re-use factor of N=2. Accordingly, the interleaved channel assignments allow for the use of the transmission channels in cells which are adjacent in the cellular network.

2 Claims, 9 Drawing Sheets

PRIOR ART

METHOD AND APPARATUS FOR A HIGH-CAPACITY CELLULAR NETWORK BY IMPROVED SECTORIZATION AND INTERLEAVED CHANNEL ASSIGNMENT

PRIOR PROVISIONAL PATENT APPLICATION

This is a continuation of application No. 09/321,047 filed May 27, 1999 now U.S. Pat. No. 6,311,068, which application claims the benefit of U.S. Provisional Application No. 60/104,764 filed Oct. 19, 1998.

BACKGROUND OF THE INVENTION

1. Field of the Invention

The present invention relates to a high-capacity cellular network and, more particularly, to a method and apparatus for a high-capacity cellular network by improved sectorization and interleaved channel assignment.

2. Description of the Art

Capacity is one of the most important issues in wireless systems. Because of the limited available frequency spectrum, current cellular radio systems adopt the concept of frequency reuse to utilize the same frequency repeatedly at different locations. A large frequency reuse distance can enhance channel quality due to low interference, but will decrease the overall system capacity. One challenge for cellular engineering, then, is to optimize the tradeoff among channel quality, system capacity, and the costs of infrastructure and user terminals.

In an attempt to meet the challenge, there are two directions taken to improve the tradeoff between channel quality and system capacity. One direction is to adopt more sophisticated technologies, such as code division multiple access (CDMA), adaptive antenna array, and dynamic channel allocations (DCA), etc. These techniques are capable of handling high interference, thereby reducing frequency reuse distance and thus increasing system capacity. They also relieve the burden of frequency planning. However, in addition to increasing the cost of base station equipment and user terminals, these techniques also breed a host of new issues. For example, a CDMA system requires sophisticated power planning to achieve high capacity. The adaptive antenna array processing needs to deal with the power consumption issue and the size of users' handsets. The DCA systems must meet some operational conditions to function effectively, e.g., the accuracy of time synchronization among all base stations and the agility of user terminals' synthesizers, etc.

On the other hand, the second direction, a more economical approach to enhance the spectrum efficiency, is to develop a better cellular engineering methodology. This approach is economical in the sense that it minimizes the cost of base station equipment and requires no changes on user terminals at all. Thus a better cellular engineering methodology usually results in equivalent improvements on both downlink and uplink transmissions. This type of cellular engineering includes three major aspects: 1) optimizing frequency planning to reduce interference; 2) selecting a cell architecture to improve the coverage and interference performance; and 3) choosing better cell site locations to enhance service coverage.

To optimize frequency planning and coverage and interference performances, traditional cellular engineering considers a frequency reuse factor of $N \geq 3$, only to ensure at least a "buffered" cell between co-channel cells, where the re-use factor N is defined as the number of cells repetitively sharing the whole frequency spectrum once. The smaller the reuse factor N, the closer together the same channel frequency can be utilized at different antenna locations in the cellular network and, thus, the higher the system capacity. Few papers in the area of cellular engineering even discuss system architectures with a low reuse factor of $N \leq 2$. One paper, an article entitled "A Novel Two Site Frequency Reuse Plan" by J. Xiang, discusses a cell planning approach that can achieve a reuse factor of N=2, unfortunately, however, at the cost of using six antennas at a cell. Also, in an article entitled "Radio Resource Allocation in Fixed Broadband Wireless Networks" by T. K. Fong et al., a frequency planning method with a reuse factor of N=1 is discussed, but is, however, only suitable for receiver terminals at fixed locations. Lastly, an article entitled "A New Cellular Architecture based on an Interleaved Cluster Concept" by Li-Chun Wang, and which is hereby incorporated by reference, discusses that the cellular system can achieve a reuse factor of N=2 with good channel quality by using a sector rotation technique and clover-leaf cellular architecture. However, with this technique the impact of variations of cell site location are unknown.

SUMMARY OF THE INVENTION

Accordingly, the present invention introduces an improved cellular planning method and apparatus to achieve a high-capacity cellular mobile network having a reuse factor as low as N=2. Such a low reuse factor, while maintaining coverage and interference performance optimization, is achieved by an improved cellular architecture, the Narrow-Beam Quad-sector Cell (NBQC), in conjunction with a new frequency planning technique, the Interleaved Channel Assignment (ICA).

The Narrow-Beam Quad-sector Cell (NBQC) is a sectorization scheme for a cell of a cellular network which employs four 60° directional antennas at a base station, each of which is separated by 90°. Such a sectorization scheme thus breaks up the single cell into four square-shaped sectors and allows for better coverage and interference performance.

Taking advantage of the NBQC, the Interleaved Channel Assignment (ICA) is a unique way of channel assignment in which each cell in the same column of a cellular network is assigned with four channels (or channel sets), one for each of the cell's four sectors. To take full advantage of the directivity of the sectoral antennas, the channels assigned to the corresponding sectors of adjacent cells in the same column are interleaved. Thus the interleaved channel assignment allows for cells in a neighboring column to use a different set of four channels, thus yielding a frequency reuse factor of 2 and optimizing frequency planning.

The present invention, including its features and advantages, will become more apparent from the following detailed description with reference to the accompanying drawings.

DETAILED DESCRIPTION

FIGS. 1 through 9 illustrate both the background of and a new method and apparatus for a high-capacity cellular network by improved sectorization and interleaved channel assignment.

Figure 1:
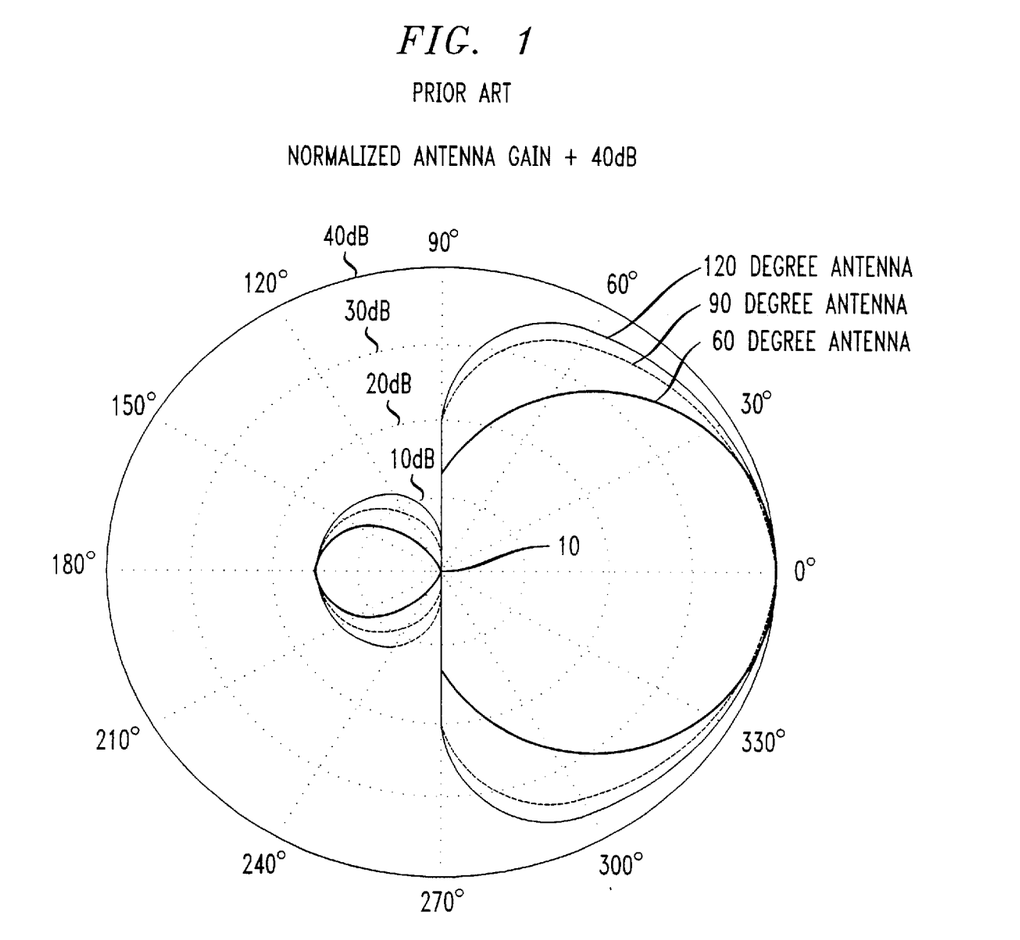
FIG. 1 illustrates the known radiation patterns for 60°, 90° and 120° directional antennas.

A cellular engineer, in designing a cell architecture for a cellular network, must determine what sectorization technique to use. One of the important factors in influencing the effectiveness of a sectorization technique is the beamwidth of a directional antenna. The beamwidth of the directional antenna impacts the transmission coverage area of the antenna in the cell. The antenna's transmission coverage area is in turn determined by the signal-strength contour. One major factor, inter alia, which determines the signal-strength contour is the antenna radiation pattern. Referring to FIG. 1, the known radiation patterns for 60°, 90° and 120° directional antennas are shown. Each radiation pattern is shown as the contour of an antenna gain out to a point of 40 dB relative to the front direction of the directional antennas from a common transmission point 10. From the known radiation patterns of the antennas, the cellular engineer can thus determine which antenna beamwidth is best suited to which type of sectorization scheme the engineer is developing.

A second important factor in influencing the effectiveness of a sectorization technique is the number of sectors per cell. Intuitively, the more sectors in a cell, the less interference in the system. Thus, the number of sectors chosen will have a direct impact on reduction of co-channel interference and increasing the system capacity. However, too many sectors at a cell can cause excessive handoffs and increase equipment and operational costs.

Figure 2:
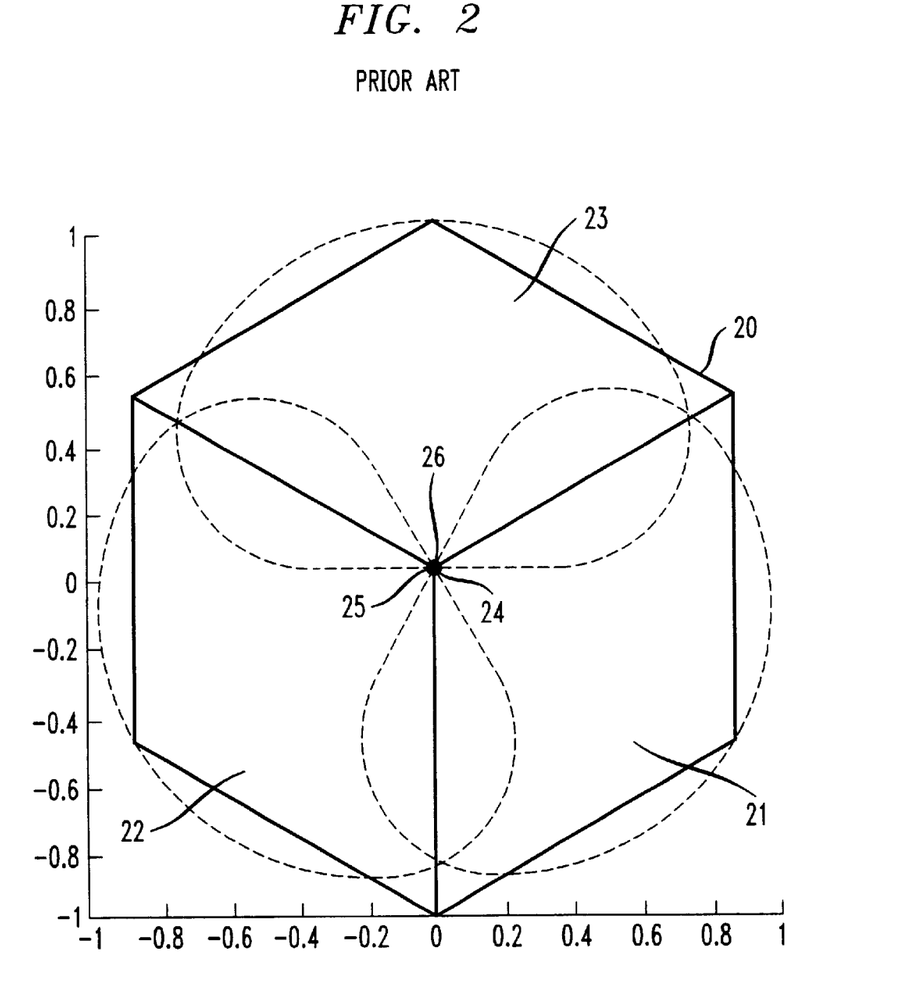
FIG. 2 illustrates a sectorization of a cell in which a base station is employing three 120° directional antennas, what is known for the first generation of cellular mobile systems as the Wide-Beam Tri-sector Cell (WBTC).

Referring to FIG. 2, a known first generation Wide-Beam Tri-sector Cell (WBTC) architecture 20 is shown in the shape of a hexagon. The hexagon-shaped WBTC 20 is sectorized into three diamond-shaped sectors 21, 22 and 23. For each sector 21, 22 and 23, directional 120° antennas 24, 25 and 26 are placed at the WBTC's center point and have the radiation patterns as shown (in dashed line) to cover the diamond-shaped sectors 21, 22 and 23, respectively. From the figure it can be observed, however, that at the far corners of the common boundaries of the diamond-shaped sectors 21, 22 and 23, the coverage areas of direction antennas 24, 25 and 26 do not match the actual coverage contour of the diamond-shaped sectors 21, 22 and 23. Therefore, poor coverage occurs in these areas.

Figure 3:
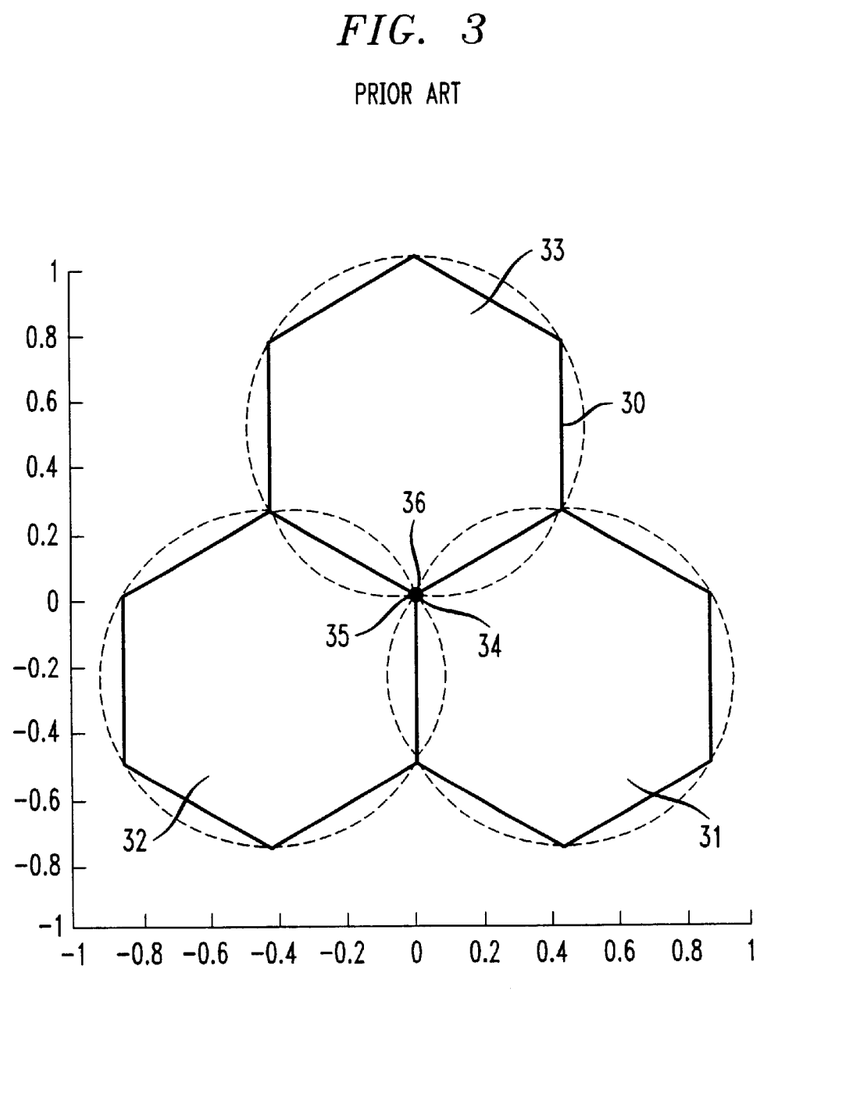
FIG. 3 illustrates a sectorization of a cell in which a base station is employing three 60° directional antennas, what is known for the second generation of cellular mobile systems as the Narrow-Beam Tri-sector Cell (NBTC).

Referring to FIG. 3, a known second generation Narrow-Beam Tri-sector Cell (NBTC) architecture 30 is shown. The NBTC 30 is sectorized into three hexagon-shaped sectors 31, 32 and 33. For each sector 31, 32 and 33, directional 60° antennas 34, 35 and 36 are placed at the NBTC's center point and have the radiation patterns as shown (in dashed line) to cover the hexagon-shaped sectors 31, 32 and 33, respectively. With three such antennas, the coverage contour of the NBTC 30 is much like a clover-leaf. Because of the better match between the cellular contour and the actual cell coverage, the NBTC architecture 30 performs better than the WBTC architecture 20. However, while the NBTC eliminates the coverage problem of the WBTC, it can be shown that having three directional antennas to serve three sectors per cell does not take full advantage of the directional antennas to suppress co-channel interference. As a result, typical cellular networks using WBTC and NBTC require a channel reuse factor of N≧3 to yield adequate channel quality.

Figure 4:
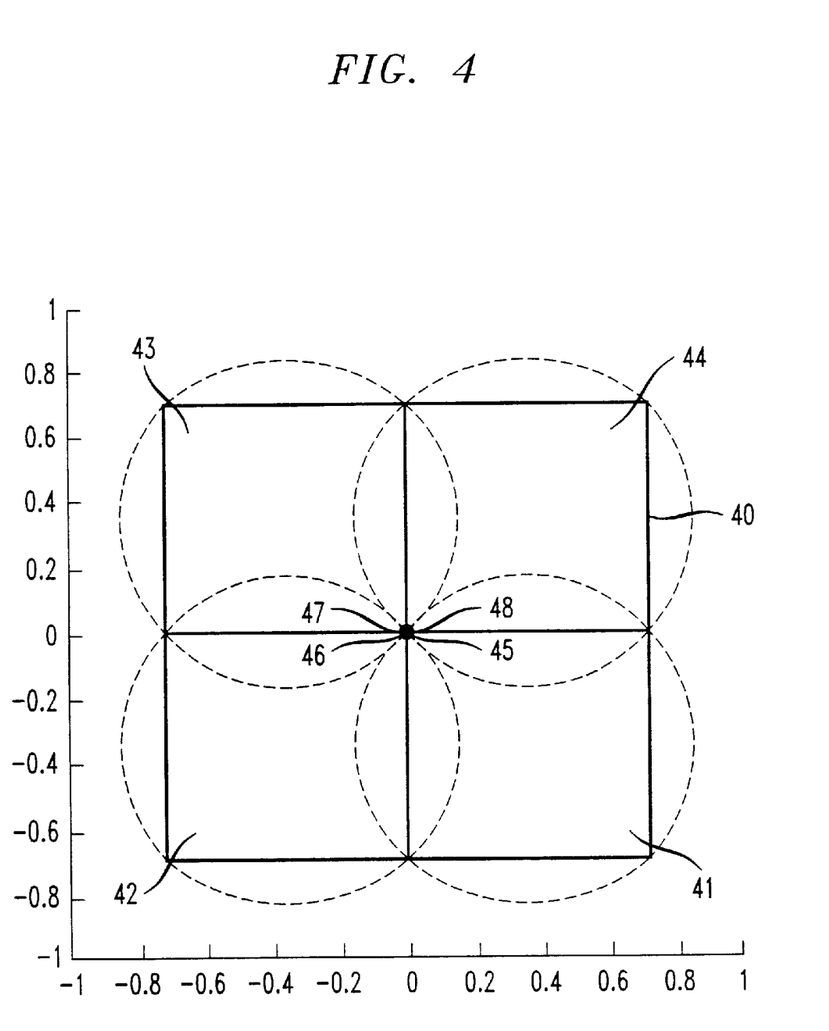
FIG. 4 illustrates a sectorization of a cell in which a base station is employing four 60° directional antennas to create a Narrow-Beam Quad-sector Cell (NBQC), according to an embodiment of the present invention.

Referring to FIG. 4, a sectorization scheme architecture, called the Narrow-Beam Quad-sector Cell (NBQC) 40 is shown, according to an embodiment of the present invention. The NBQC 40 is sectorized into four square-shaped sectors 41, 42, 43 and 44, and employs four 60° directional antennas 45, 46, 47 and 48. For each sector 41, 42, 43 and 44, one of the four 60° directional antennas 45, 46, 47 and 48 is placed at the NBQC's center point to have a radiation pattern, each of which is separated by 90° as shown (in dashed line), to cover the respective square-shaped sector. Sectorizing the cell in such a way avoids the coverage problem at the corner sector boundaries associated with the sectorization scheme of the WBTC 20, and provides better coverage performance than both the WBTC 20 and NBTC 30 architectures. By adding one more antenna per cell, the NBQC architecture 40 has more diversity gain in selecting the serving sector, and as a result, the signal strength of a cellular phone user in an NBQC system is better than that in an NBTC system. Further, due to the overlapped areas between sectors, the requirements of the handoff completion duration of both the WBTC and NBTC, i.e., the time period required to transfer responsibility for communications to a cellular phone from one antenna to the next, can be relaxed. In fact, the additional overlapped antenna radiation area in the NBQC system yields improvements for both inter-cell and intra-cell handoffs. Also, it should be noted that the NBQC system can be implemented using the same cell sites and same antennas of the existing systems, only requiring the addition of one antenna. Lastly, it is to be understood, of course, that the sectorization of the cell need not result in only square-shaped sectors, and that accordingly the sectors may be of other shapes.

Implementation of the differing cell architectures and sectorization schemes, as discussed above, allows for implementation of differing channel frequency reuse factors for purposes of frequency planning by the cellular engineers. As stated above, the frequency reuse factor N is defined as the number of cells repetitively sharing the whole frequency spectrum once. In other words, the frequency reuse factor N determines how close together the same channel frequency sets can be utilized at different antenna locations in a cellular network while maintaining reasonably low levels of interference.

Figure 5:
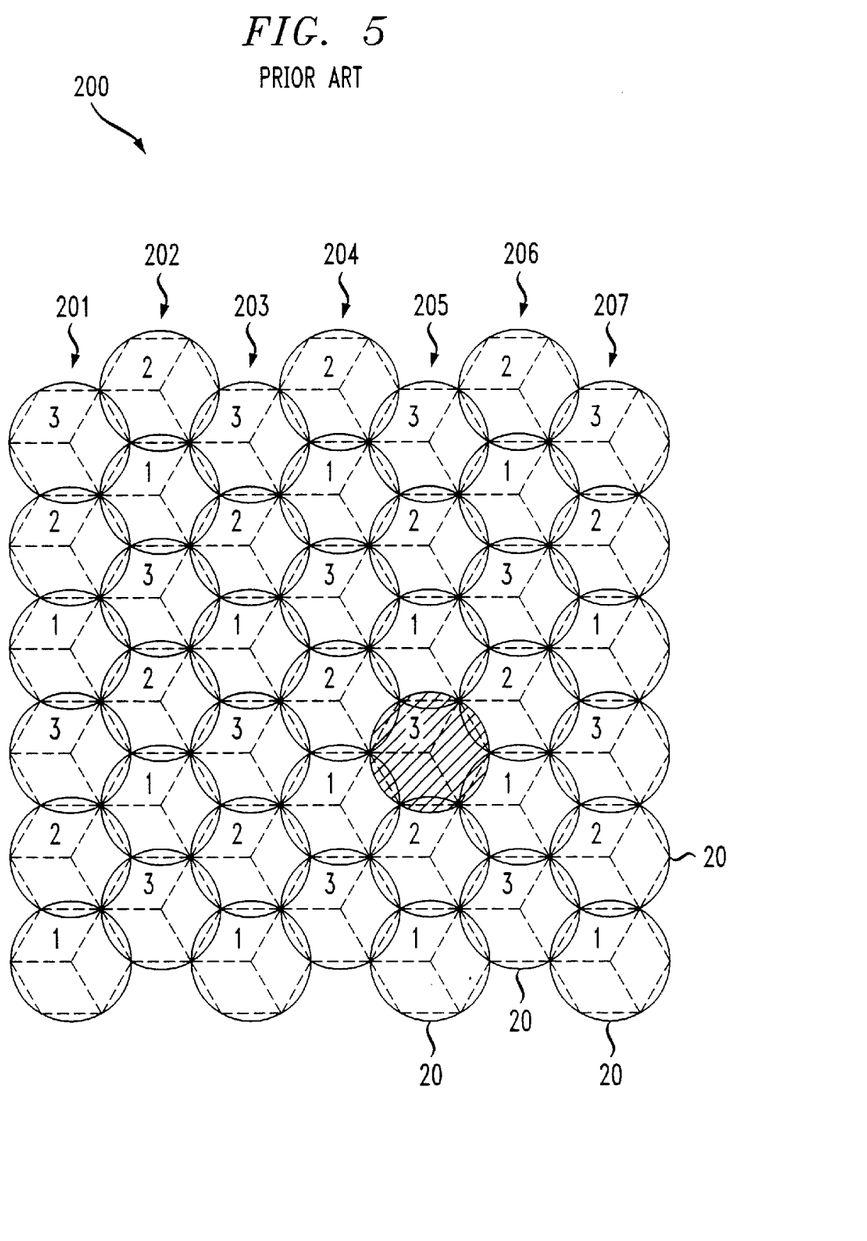
FIG. 5 illustrates a known channel assignment of a WBTC system with a reuse factor of N=3.
Figure 6:
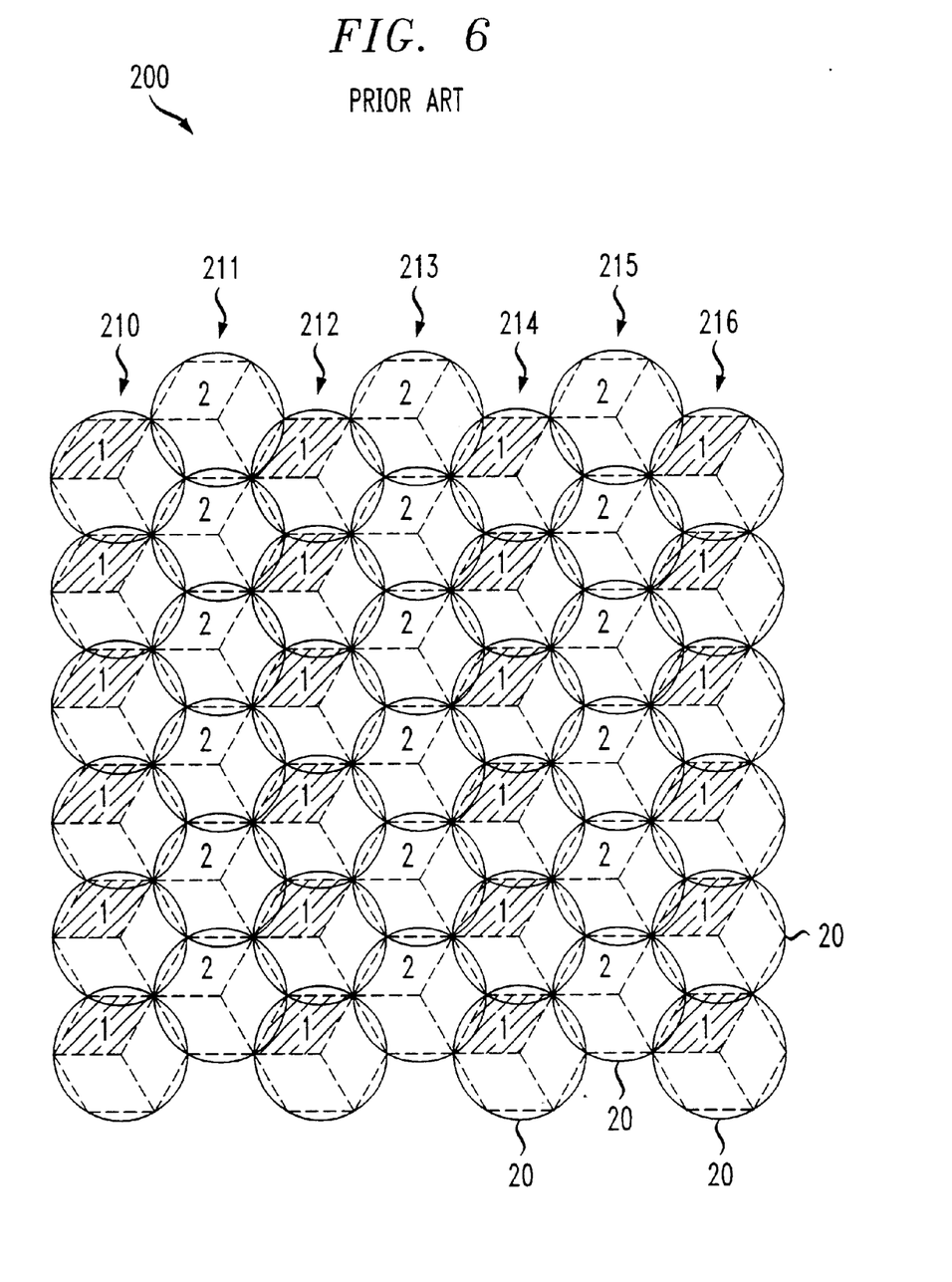
FIG. 6 illustrates a known channel assignment of a WBTC system with a reuse factor of N=2.

Referring to FIGS. 5 and 6, known channel assignments in the WBTC systems with reuse factors of N=2 and N=3 are shown. In FIG. 5, a WBTC system 200, composed of many individual WBTC architectures 20, has a reuse factor of N=3. To achieve a reuse factor of N=3, any three mutually adjacent cells must be of a different cell type. Different cell types are distinguished from one another by having different channel sets. For example, the mutually adjacent cells between columns 201 through 207 are identified by the numerals 1, 2 and 3 for each different cell type. With three different cell types in the WBTC system 200 there is a total of nine channel sets for the assignments. In assigning the channel sets, cells of the same type are identically assigned with three of the nine channel sets, each one of the three channel sets then being assigned to one of the three sectors in the cell. Antennas for each of the sectors assigned identical channel sets point towards the same direction to reduce interference. In FIG. 6, the WBTC system 200 has a reuse factor of N=2 and thus has two different cell types and six different channel sets. In this case, in each column 210 through 216, the two different cell types 1 and 2 repeat every second column of WBTC architecture 30. However, even though a frequency reuse factor of N=2 is achieved in this system, as a result of the inherent channel placements due to the reuse factor, a strong co-channel interference exists in the neighboring cells, thus significantly degrading the channel quality.

Figure 7:
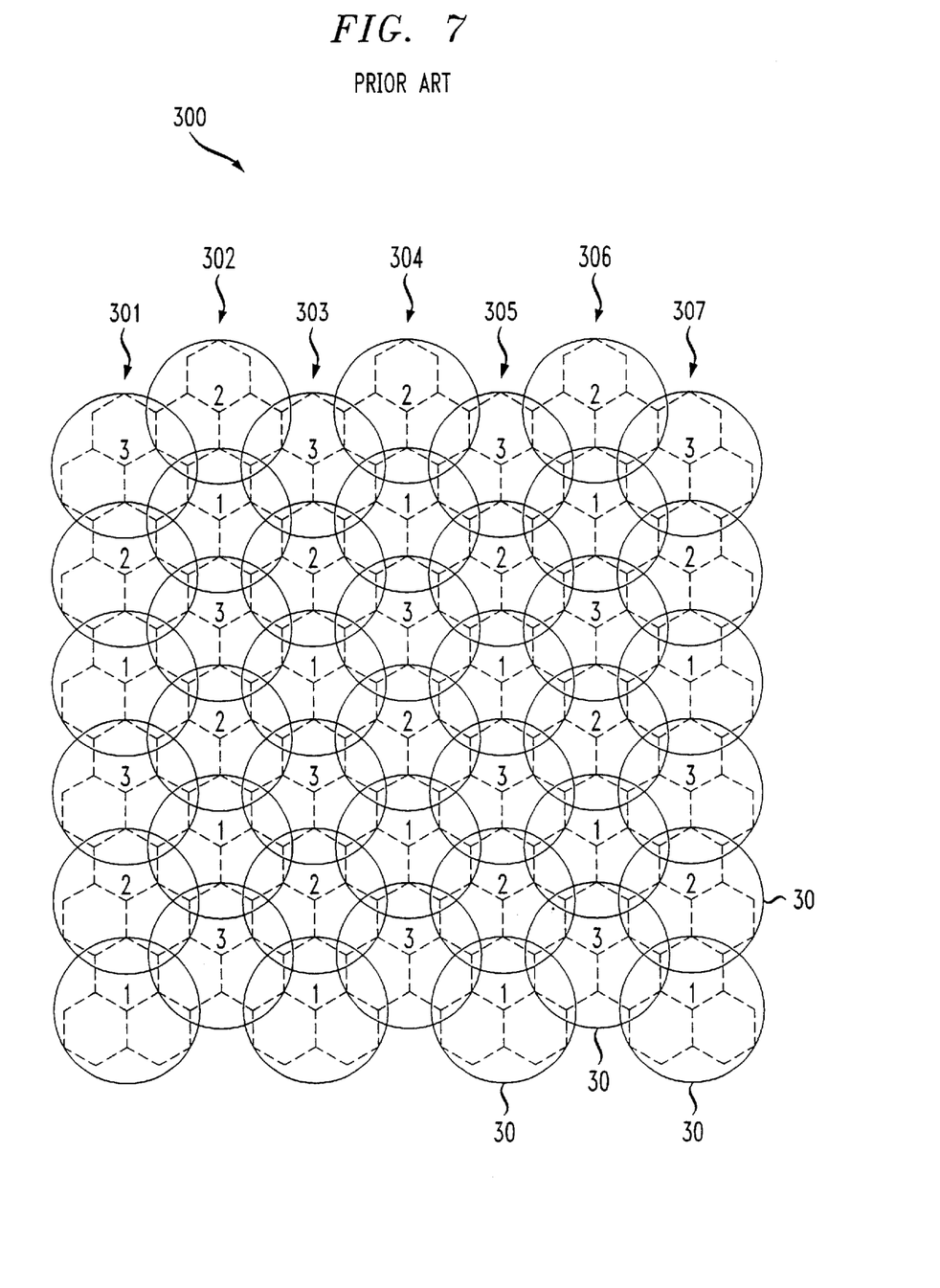
FIG. 7 illustrates a known channel assignment of a NBTC system with a reuse factor of N=3.
Figure 8:
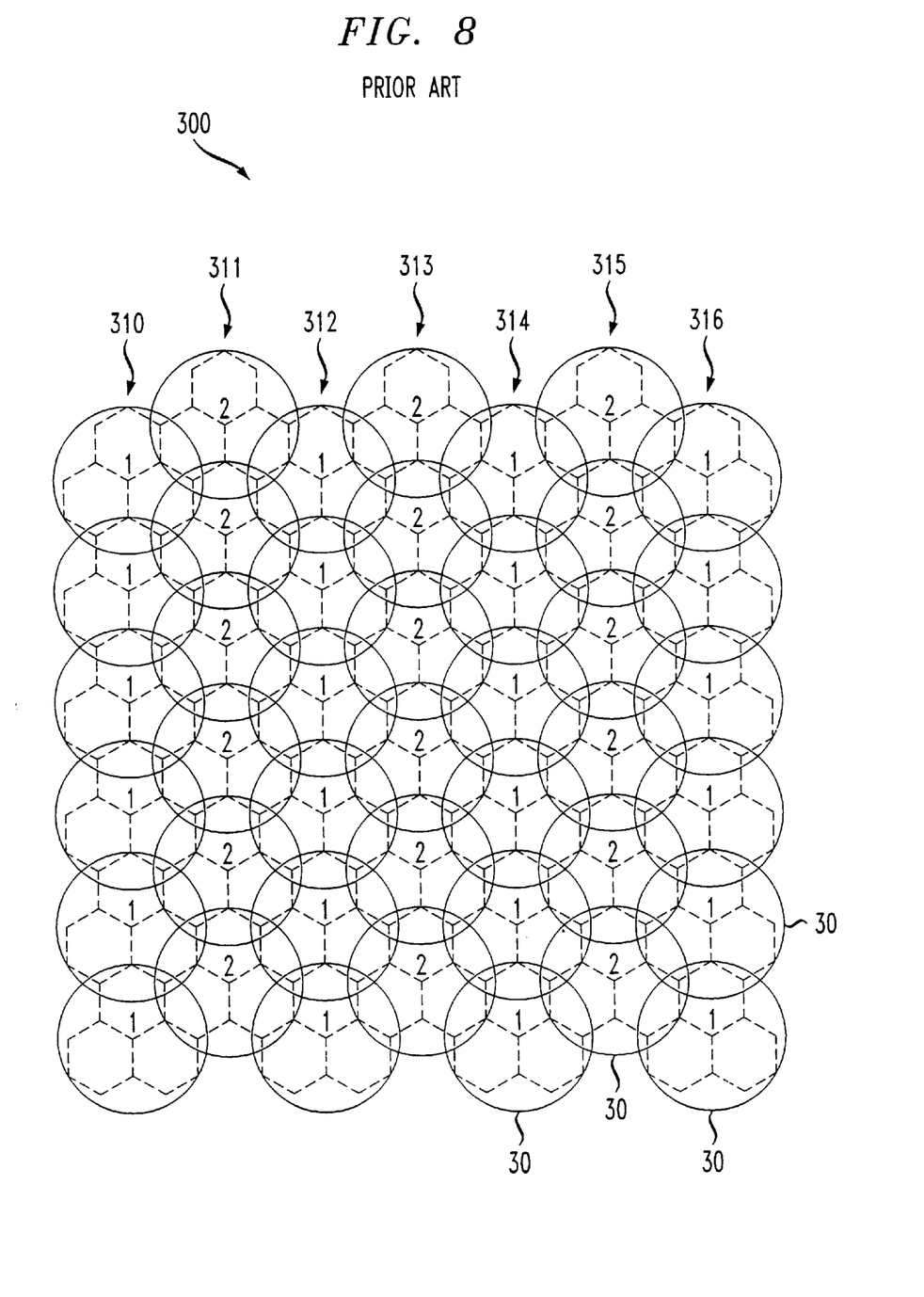
FIG. 8 illustrates a known channel assignment of a NBTC system with a reuse factor of N=2.

Referring to FIGS. 7 and 8, the same holds true for NBTC architecture systems with reuse factors of N=2 and N=3. In FIG. 7, a NBTC system 300, composed of many individual NBTC architectures 30, has a reuse factor of N=3. Following the previous logic, in each column 301 through 307 the three different cell types 1, 2 and 3 are repeated every mutually adjacent NBTC architecture 30. In FIG. 8, the NBTC system 300 has a reuse factor N=2 and accordingly has two different cell types. As before, in each column 310 through 316 the two different cell types 1 and 2 repeat every second column of NBTC architecture 30. Again, however, even though a frequency reuse factor of N=2 is achieved with the system, as a result of the inherent channel placements due to the reuse factor, a strong co-channel interference exists in the neighboring cells, thus significantly degrading the channel quality.

Figure 9:
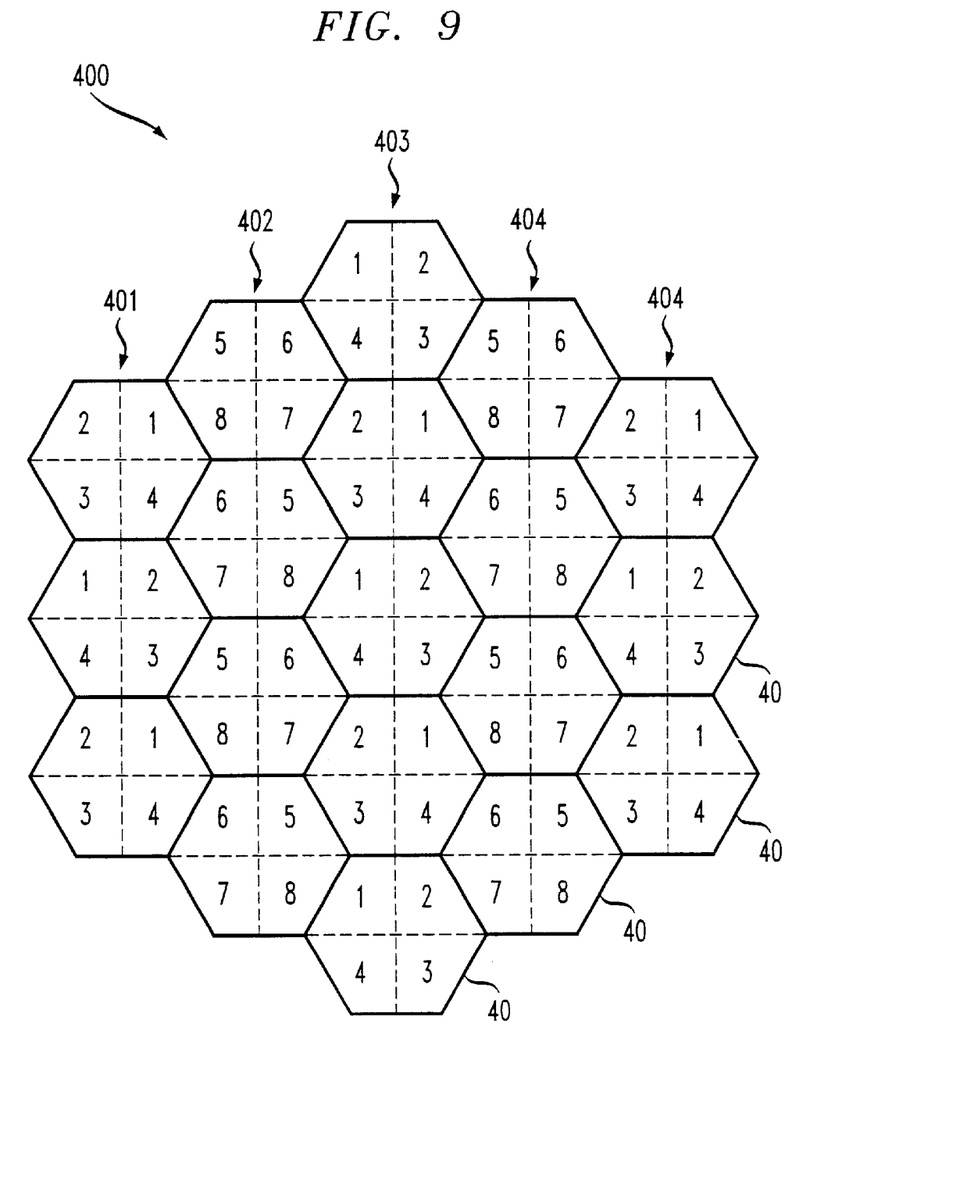
FIG. 9 illustrates an Interleaved Channel Assignment for a NBQC system with a reuse factor of N=2, according to an embodiment of the present invention.

Referring to FIG. 9, the sectorization scheme of the NBQC architecture 40, however, permits implementation in a NBQC system 400 of a unique channel assignment method, called the Interleaved Channel Assignment (ICA) method, which significantly improves channel quality. In the ICA method, each cell in the same column of a cellular network is assigned with four channels (or channel sets), one for each of the cell's four sectors. Thus two adjacent cells, having a total of eight sectors (which could then be numbered one through eight for the sake of clarity), would each have the same four channels, indicated by the numerals 1, 2 ,3 and 4, assigned to them. Of the four channels, the two channels assigned to corresponding sectors of the adjacent cells in the same column are interleaved. In other words, assuming the sectors of two adjacent cells are numbered in the same order sequentially one through eight, channels 1 and 2 would each be assigned to sectors in each of a first cell and an adjacent second cell such that channel 1 would be assigned to a first and a sixth sector and channel 2 would be assigned to a second and a fifth sector. This assignment would lead to an interleaved pattern. For example, in columns 401, 403 and 405 of NBQC system 400, the sector assignments of channels 1 and 2 are reversed (i.e., swapped) from one adjacent cell to the next throughout the length of each of the columns. The same holds true for the channel assignments of channels 3 and 4 throughout the same columns. In other words, channels 1 and 2 are continuously assigned to the upper left and upper right sectors and channels 3 and 4 are continuously assigned to the lower left and lower right sectors, each assigned in an interleaved fashion from one adjacent cell to the next. Continuing the example, the interleaved channel assignment of columns 401, 403 and 405 allows the NBQC system 400, in the neighboring columns 402 and 404, to use a different set of four channels. These channels are indicated by the numerals 5, 6, 7 and 8. In these columns 402 and 404, the sector assignments of channels 5, 6, 7 and 8 follow the same ICA method as outlined. Thus, as can be seen, a NBQC system 400, composed of many individual NBQC architectures 40, can attain a reuse factor of N=2 and take full advantage of the directivity of the sectoral antennas. It is to be understood, of course, that the channel assignments is not to be limited to the example described above and may be accomplished in any other fashion such that the channels are interleaved.

Implementation of the NBQC and ICA in conjunction lead to a high-capacity cellular network as borne out by thousands of simulation trials. Coverage and interference performance are consistently better than the WBTC and NBTC systems. Further, an NBTC or WBTC system can be upgraded to an NBQC system without requiring changes to the layout of an NBTC or WBTC system. Furthermore, the ICA of the present invention has proven to be a powerful technique to combat interference.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A method for creating a high-capacity cellular network having a plurality of cells, the method comprising:

sectorizing the cells to each have four sectors; and
assigning in an interleaved fashion at least one channel to each one of the plurality of sectors wherein:
sectorizing the cells to each have four sectors comprises:
sectorizing a first one of the cells into a first sector, a second sector, a third sector, and a fourth sector, and sectorizing a second one of the cells into a fifth sector, a sixth sector, a seventh sector, and an eighth sector;
and assigning in an interleaved fashion at least one channel to each one of the plurality of sectors comprises:
assigning a first channel to both the first sector of the first cell and to the sixth sector of the second cell;
assigning a second channel to both the second sector of the first cell and to the fifth sector of the second cell;
assigning a third channel to both the third sector of the first cell and to the eight sector of the second cell; and
assigning a fourth channel to both the fourth sector of the first cell and to the seventh sector of the second cell.

2. A high-capacity cellular network, comprising:

a plurality of sectorized cells, each of the sectorized cells having four sectors;
wherein a frequency channel is assigned to each sector in an interleaved fashion wherein the plurality of cells comprise first and second cells, the first cell being sectorized into a first sector, a second sector, a third sector, and a fourth sector, wherein a first frequency channel is assigned to both the first sector of the first cell and to the sixth sector of the second cell, a second frequency channel is assigned to both the second sector of the first cell and to the fifth sector of the second cell, a third frequency channel is assigned to both the third sector of the first cell and to the eighth sector of the second cell, and a fourth frequency channel is assigned to both the fourth sector of the first cell and to the seventh sector of the second cell.

* * * * *